United States Patent [19] | [11] 3,754,659
Krynski et al. | [45] Aug. 28, 1973

[54] SLUICE MEANS AND ROTATABLE NOZZLES

[75] Inventors: John E. Krynski, East Moline; William C. Smith, Moline; Kenneth A. Anderson, Silvis, all of Ill.

[73] Assignee: Ametek, Inc., New York, N.Y.

[22] Filed: June 4, 1971

[21] Appl. No.: 150,095

[52] U.S. Cl. ............................... 210/334, 210/346
[51] Int. Cl. ...................... B01d 29/38, B01d 29/34
[58] Field of Search ..................... 210/81, 332, 334, 210/346

[56] References Cited
UNITED STATES PATENTS

| | | | |
|---|---|---|---|
| 3,285,417 | 11/1966 | Schmidt et al. | 210/81 |
| 3,426,907 | 2/1969 | Stone | 210/332 |
| 3,344,922 | 10/1967 | Kracklauer | 210/81 |
| 2,609,101 | 9/1952 | Howland et al. | 210/334 |
| 3,680,702 | 8/1972 | Weinstein | 210/81 |

Primary Examiner—Frank A. Spear, Jr.
Attorney—Smythe & Moore

[57] ABSTRACT

A horizontally disposed filter has a plurality of filter leaf elements spaced along its axis with a sluicing assembly provided for sluicing filter cake from the leaves. The assembly includes a pair of pivotally mounted crank-shaped arms whose outer portions are positioned outwardly of the peripheral edges of the filter leaf elements and on opposite sides thereof. Each arm pivots through an angle of about 80° and linkage or cable means are provided to pivot nozzles positioned on the outer portions of the arms. The nozzles pivot through angles of about 155° so that a sluicing liquid sprayed from the nozzles is distributed over the surfaces of the filter leaf elements. While the sluice arms pivot back and forth through their angles, the nozzles are concurrently pivoted with respect to the sluice arms.

8 Claims, 9 Drawing Figures

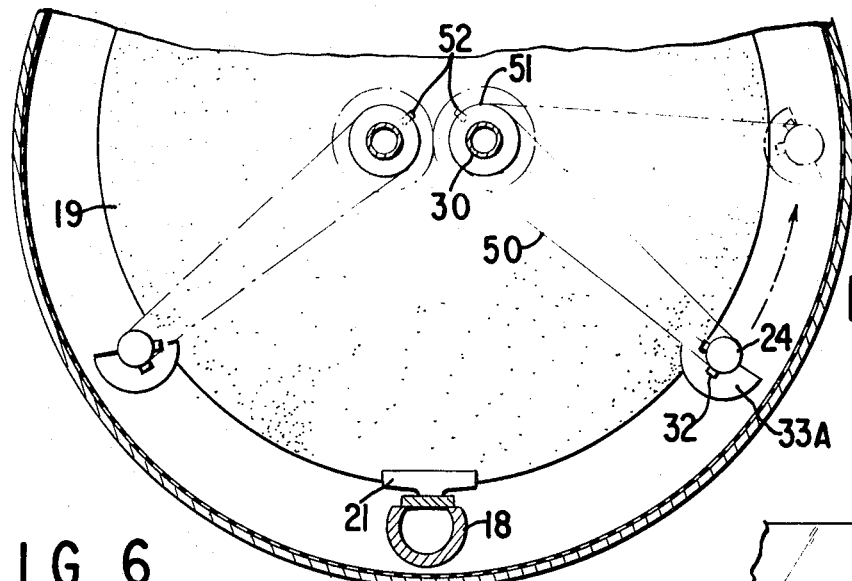
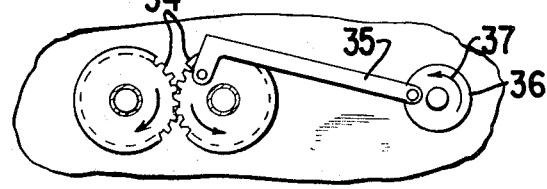
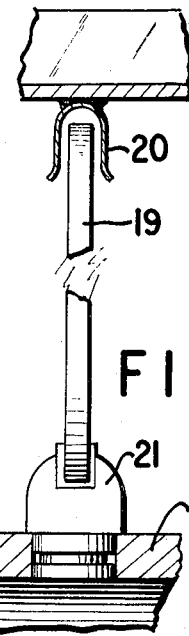
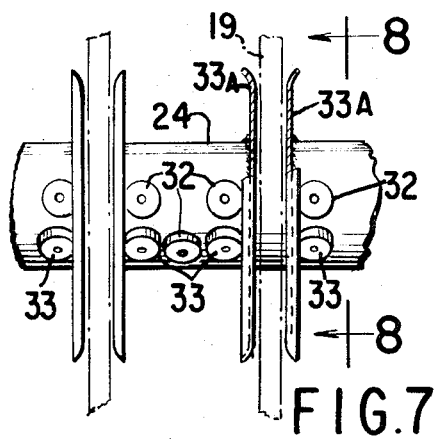
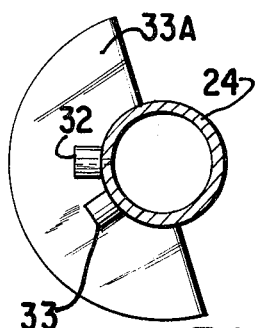
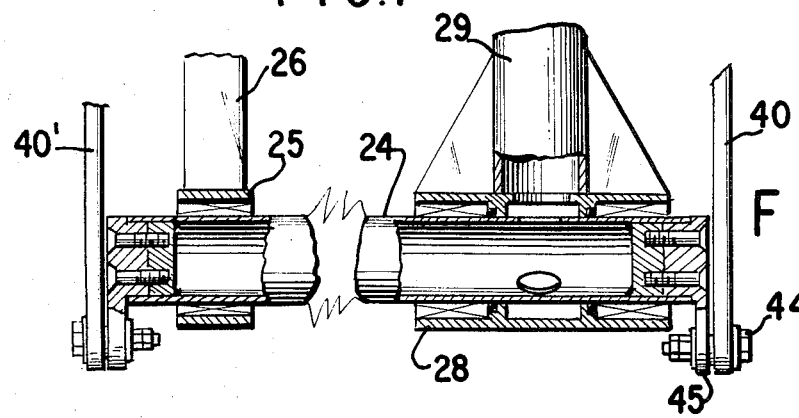

SLUICE MEANS AND ROTATABLE NOZZLES

In known forms of leaf filters, the liquid to be clarified is introduced into a tank in which are mounted a plurality of spaced filter leaf elements. The liquid flows into contact with the filter leaves and the solids within the liquid accumulate on the outer surfaces of the filter leaves to form filter cake as the clarified liquid passes through the leaves. The filter eventually has cake accumulate on the leaves to the point where the operational efficiency of the filter is impaired. The filter cake may be removed either in dry form by scraping or may be rinsed or washed off by directing high velocity jets or sprays of liquid onto the accumulated filter cake. This method of washing the filter cake off of the filter leaf elements is known in the art as "sluicing."

Various forms of sluicing assemblies have been devised in an effort to distribute efficiently sprays of rinsing liquid over the filter leaf surfaces in order to remove filter cake therefrom. Such arrangements have included oscillation of various types of arms having oscillatory movement and other structures upon which spray nozzles and scrapers have been mounted. Such known sluicing assemblies have not been completely satisfactory for all purposes in that they did not succeed in efficiently removing the filter cakes from the filter leaf elements under some types of operation.

One of the objects of the present invention is to provide an improved sluicing assembly for a pressure filter.

Another object of the present invention is to provide a sluicing assembly which effectively distributes sluicing liquid over the surfaces of the filter leaf elements.

Still another object of the present invention is to provide a simple but reliable structure for a sluicing assembly which is movable during the sluicing operation to distribute the sluicing liquid over the surface areas of the filter leaf elements in such a manner as to edgewise undercut the cake.

In one aspect of the invention, a filter tank having a plurality of transverse filter leaf elements spaced along the longitudinal axis of the tank is provided with a sluicing assembly. The sluicing assembly may comprise a pair of crank-shaped sluice arm means coextensive with the filter leaf elements and mounted for pivotal movement about an axis parallel to the longitudinal axis of the filter tank so as to describe a bird wing-like movement. The sluice arm means are hollow and are connected to a source of sluicing fluid. A plurality of spray nozzles are mounted on the sluice arm means are are positioned adjacent opposed faces of the several filter leaf elements. Means are provided for pivoting the spray nozzles concurrently with the pivoting of the sluice arm means so that the sluicing fluid sprayed from the nozzles is distributed over the surface areas of the filter leaf elements and undercuts the cake thereon in the removal process. The sluice arm means may comprise a pair of substantially U-shaped hollow tubular members with the outer portions thereof adjacent the outer peripheral edges of the filter leaf elements on opposite sides thereof. The outer portion of each sluice arm is rotatable and has the spray nozzles mounted thereon. The rotatably mounted sluice pipe is pivoted by means of a linkage or cable arrangement. Thus, while each of the sluice arms is being reciprocated through an angle, the spray nozzles on the outer portions of each sluice arm are also being pivoted so as to spray the sluicing liquid over the filter leaf element surfaces.

Other objects, advantages and features of the present invention will become apparent from the accompanying description and drawings, which are merely exemplary.

In the drawings:

FIG. 4 is a view similar to that of FIG. 3 but showing a cable arrangement for pivoting the spray nozzles;

FIG. 5 is a broken enlarged portion of FIG. 1 showing the mounting of a filter leaf element;

FIG. 6 is an elevational view of the cover end of the tank showing a crank arm arrangement for oscillating the sluice arms;

FIG. 7 is an elevational view of a portion of the sluice pipe of FIG. 1 but in enlarged scale to show the arrangement of the spray nozzles and baffles with respect to a filter leaf element;

FIG. 8 is a sectional view taken along the line 8—8 of FIG. 7; and

FIG. 9 is a broken longitudinal sectional view of the end portions of the pivotally mounted sluice pipe shown in FIG. 1.

Proceeding next to the drawings wherein like reference symbols indicate the same parts throughout the various views, a specific embodiment and modifications of the present invention will be described in detail.

Figure 1:
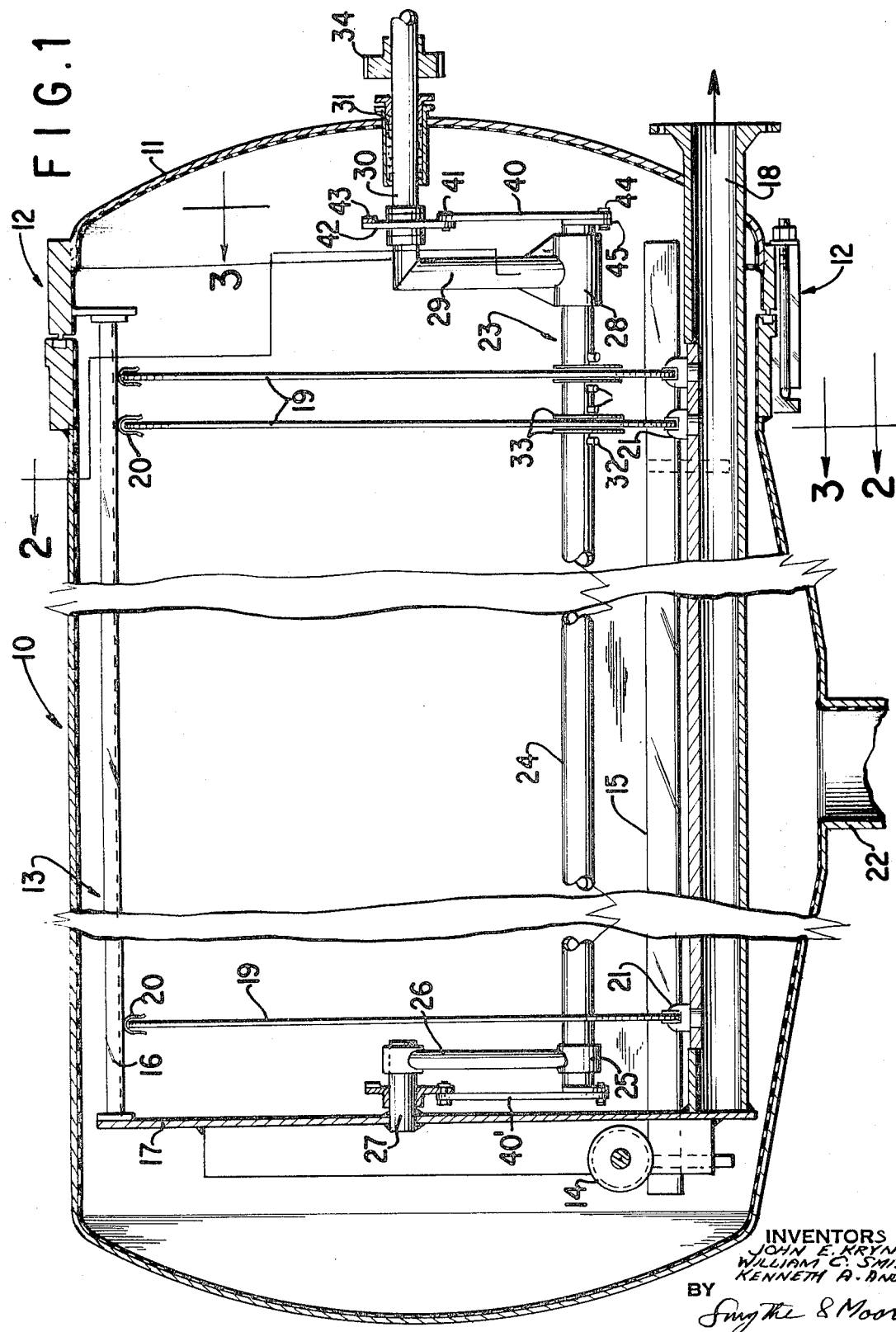
FIG. 1 is a vertical longitudinal sectional view of a horizontal filter tank incorporating the sluicing assembly of the present invention.

As may be seen in FIG. 1, the present invention of a sluicing assembly is incorporated in a filter tank which is horizontally disposed and is indicated generally at 10 having a removable cover 11 at one end thereof retained in sealed relation by means of a swinging bolt arrangement 12 as conventional in the art.

A filter leaf carriage is indicated generally at 13 and is attached to the removable cover 11 so as to be movable therewith. Frame 13 is carried by wheels or rollers 14 upon rails 15 mounted within the tank as may be seen in FIG. 2. The frame further comprises an upper supporting member 16 which has one end attached to the cover 11 and the other member attached to a rear frame member 17. The frame also comprises a pipe 18 which is extended through the cover member 11 and is secured thereto such as by welding or the like. The inner end of the pipe 18 is also attached to the rear frame member 17.

A plurality of filter leaf elements 19 are supported between brackets 20 on the upper frame member 16 and brackets 21 on the pipe 18 in a manner known in the art and illustrated in greater detail in FIG. 5. The lower bracket or channel-shaped member 21 also functions as a drain and has an opening therein which communicates with the outer periphery of a filter leaf element and the interior of the pipe 18.

The lower portion of the tank 10 inclines downwardly and has attached thereto a central cake discharge 22.

The sluicing assembly comprises a pair of similar sluice arms indicated generally at 23, each of which is generally crank-shaped or U-shaped. Each sluice arm comprises a sluice pipe 24 which extends the length of the filter elements 19 and is positioned outwardly of the peripheral surfaces thereof. The sluice pipe 24 has one end rotatably supported at 25 in a leg 26 which is pivotally mounted about a shaft 27 fixed in the rear frame member 17. The other end of the sluice pipe 24 is journaled at 28 to a leg 29 which is tubular ad is connected at its upper end to a substantially horizontal tubular shaft 30 which extends outwardly of the cover 11 through a packing 31.

Figure 2:
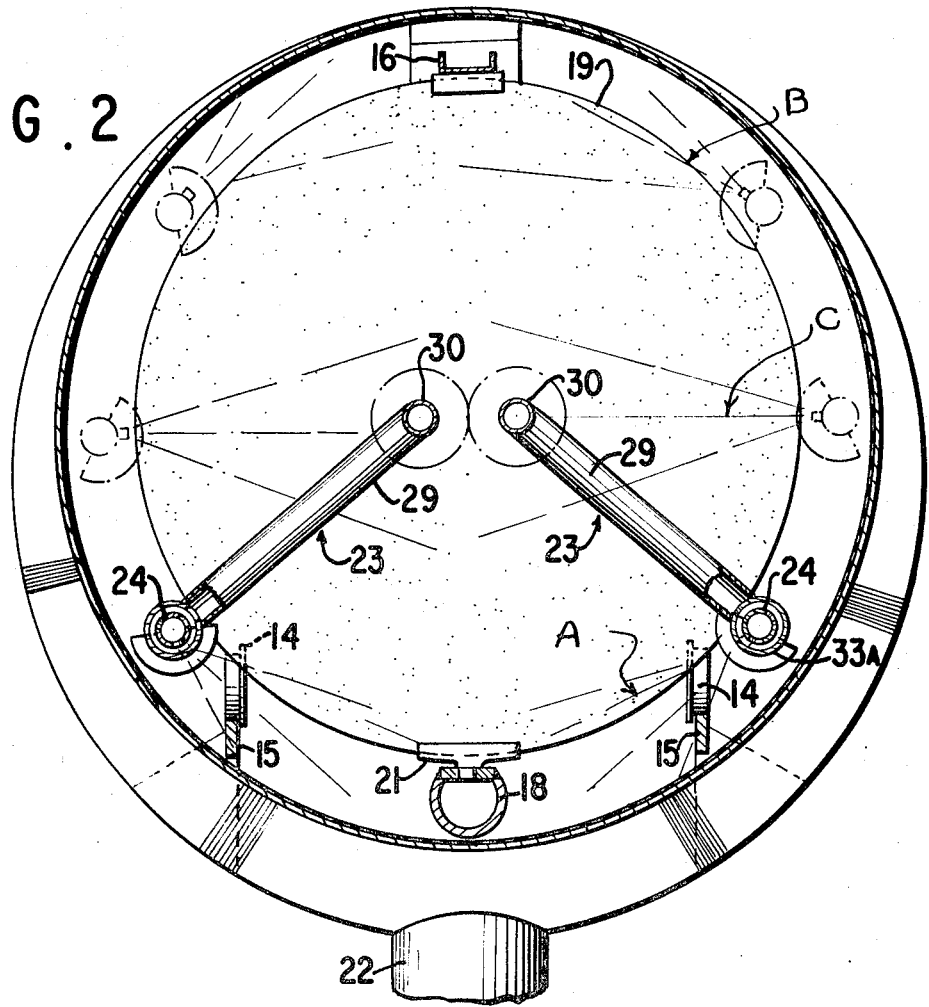
FIG. 2 is a sectional view taken along the line 2—2 of FIG. 1.

As may be seen in FIG. 2, the shafts 30 of the sluice arms are spaced from each other and are mounted on a horizontal plane which intersects the central longitudinal axis of the filter leaf elements 19. The axes of rotation of the shafts 27 and 30 of a sluice arm are the same. It also is possible to have the same axis of rotation (not shown).

Positioned along the length of the sluice pipe 24 are a plurality of spray nozzles 32, 33 with the nozzles being positioned adjacent opposing faces of a filter leaf element as may be seen in FIG. 7. A leaf guide 33A is mounted on the sluice pipe 24 as may be seen in FIGS. 7 and 8. The leaf guide 33A functions to guide the filter leaf into the proper relationship with the spray nozzles. Various arrangements of spray nozzles can be used.

The shafts 30 have gears 34 mounted thereon exteriorly of the tank with these gears meshing as may be seen in FIG. 6. One of the gears 34 is connected by means of a crank arm 35 to a disc 36 which rotates in the direction indicated by the arrow 37. The disc 36 is rotated by a source of power which is not shown. Rotation of the disc 36 will cause the meshing gears 34 to rotate through respective angles of about 80° as may be seen in FIG. 2.

Figure 3:
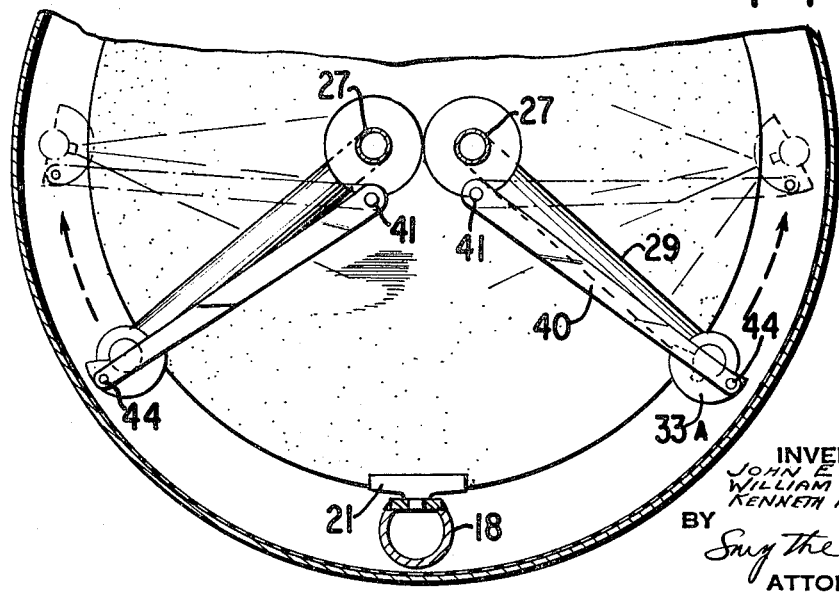
FIG. 3 is a sectional view taken along the line 3—3 of FIG. 1 and showing a linkage arrangement for pivoting the spray nozzles.

Simultaneously with the pivoting movement of the sluice arms, each sluice pipe 24 is pivoted through an angle of about 155° so that the spray nozzles 32 are moved through a similar angle to distribute spray over the surfaces of the filter leaf elements. The movement of the nozzles can be seen in FIGS. 2 and 3. In FIG. 3, the sluice pipe 24 is pivoted by means of a link 40 which has one end pivotally connected at 41 to a disc 42 mounted upon the shaft 30 but maintained against rotation by means of a bracket 43. The other end of link 40 is connected at 44 to a crank arm 45 mounted at the end of the sluice pipe 24 as may be seen in FIG. 8. Thus, as the sluice arm pivots through an angle of about 80°, the sluice pipe 24 and the nozzles 32 thereon will also be pivoted through their own angles of about 155° because of the linkage connection, including the link 40 and crank arm 45.

In FIG. 4, the sluice pipe 24 is pivoted through its angle by means of a cable or flexible band 50 which extends around the sluice pipe and around a disc 51 positioned concentrically with the shaft 30. A pin 52 secures the cable 50 against movement with respect to the disc 51 so that as the sluice arm pivots, the cable 50 will cause a pivoting movement in the sluice pipe 24, As can be seen in FIG. 1, the link 40' adjacent the leg 26 is similar to link 40 and accomplishes the same function. By utilizing these links at both ends of the sluice pipe, excessive strains and stresses in the sluice pipe are avoided when the cables are used as described above in FIG. 4.

In a similar manner, the cable or flexible band arrangemeut of FIG. 4 can also be employed with cables at both ends of the sluice pipe.

Thus, it can be seen that the sluicing assembly of the present invention maximizes the sluicing of a pressure filter by applying the sluice liquid in a controlled fashion from the bottom edge A of the filter leaf progressively to the top B thereof and maximizes the energy gradient as measured on the vertical center line of a horizontal leaf filter. The energy gradient becomes essentially constant from the bottom of the filter tank to the top through the central position C. As each of the sluice arms of the sluicing assembly pivots, the nozzles on the ends of the arms also pivot so as to give the most effective angle of contact at all times. Thus, there is provided a double action comprising the pivoting of a sluice arm and the pivoting of a nozzle assembly on the end of the arm. The sluice arms could also be mounted upon a common pivot point as well as the spaced pivot points disclosed herein. The common pivot point arrangement might offer advantages in a particular situation. The nozzles are arranged so as to erode or undercut the cake as the arms and nozzle means move so as to erode rather than compact the cake on the leaf. The direction of the jet or spray is in a generally edgewise or parallel direction relative to the cake surface. A specific arrangement of the nozzles and their operation is shown and described in copending application Ser. No. 150,064, filed June 4, 1971.

It will be understood that various details of construction and arrangements of parts may be made without departing from the spirit of the invention except as defined in the appended claims.

We claim:

1. In a filter having a plurality of transverse filter leaf elements spaced along the axis of the filter, a sluicing assembly comprising crank-shaped sluice arm means coextensive with the filter leaf elements and mounted for pivotal movement about an axis parallel to the axis of the tank, said sluice arm means being hollow and connected to a source of sluicing fluid and having a rotatable longitudinally extending portion parallel to the axis of the filter, a plurality of spray nozzles on said lontitudinally extending portion of said sluice arm means positioned adjacent opposed faces of the filter leaf elements, and means for rotating said longitudinal section and said nozzles thereon concurrently with the pivoting of said sluice arm means so that the sluicing fluid sprayed from the nozzles is distributed relative to cake on the filter leaf elements so as to remove the same.

2. In a filter as claimed in claim 1 wherein a pair of said sluice arm means are positioned adjacent each other and pivot on opposite sides of said filter leaf elements.

3. In a filter as claimed in claim 2 wherein the sluice arm means are oscillated in a bird wing motion.

4. In a filter as claimed in claim 2 wherein the pivot axes of said sluice arm means are on a plane intersecting the longitudinal axes of the filter leaf elements.

5. In a filter as claimed in claim 1 wherein said sluice arm means is substantially U-shaped with the inner ends of the legs thereof being pivotally mounted, said sluice arm means having a pair of legs positioned at opposite ends of said plurality of filter leaf elements and said longitudinally extending portion interconnecting the outer ends of said legs, said portion being located outwardly of the peripheral edges of said filter leaf elements.

6. In a filter as claimed in claim 5 wherein each of said spray nozzles pivots through an angle of about 155°.

7. In a filter as claimed in claim 1 wherein said means for rotating said longitudinal section comprises linkage means.

8. In a filter as claimed in claim 1 wherein said means for rotating said longitudinal section comprises cable means.

* * * * *